(12) United States Patent
Choi

(10) Patent No.: US 8,417,860 B2
(45) Date of Patent: Apr. 9, 2013

(54) HYBRID IN-VEHICLE INFOTAINMENT NETWORK

(75) Inventor: Dave Choi, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 433 days.

(21) Appl. No.: 12/851,246

(22) Filed: Aug. 5, 2010

(65) Prior Publication Data

US 2012/0036297 A1    Feb. 9, 2012

(51) Int. Cl.
*G06F 13/00* (2006.01)
(52) U.S. Cl.
USPC ......................................................... 710/100
(58) Field of Classification Search .................... 710/100
See application file for complete search history.

(56) References Cited

U.S. PATENT DOCUMENTS

| 5,369,748 | A * | 11/1994 | McFarland et al. ........... 710/309 |
| 6,145,029 | A * | 11/2000 | Deschepper et al. ........... 710/36 |
| 6,150,925 | A | 11/2000 | Casazza |
| 6,282,588 | B1 * | 8/2001 | Yamamoto ...................... 710/27 |
| 6,711,647 | B1 * | 3/2004 | Holehan ........................ 710/306 |
| 6,873,889 | B2 | 3/2005 | Vollmer et al. |
| 7,275,027 | B2 | 9/2007 | Sproule et al. |
| 7,315,094 | B2 | 1/2008 | Runge et al. |
| 7,349,391 | B2 * | 3/2008 | Ben-Dor et al. ............... 370/392 |
| 7,447,741 | B2 * | 11/2008 | AbiEzzi et al. ................ 709/204 |
| 7,484,008 | B1 | 1/2009 | Gelvin et al. |
| 7,805,559 | B1 * | 9/2010 | Stumpf et al. ................. 710/313 |
| 2004/0033821 | A1 * | 2/2004 | Slesak et al. ................ 455/575.1 |
| 2004/0054445 | A1 | 3/2004 | Vollmer et al. |
| 2004/0090121 | A1 | 5/2004 | Simonds et al. |
| 2004/0177166 | A1 | 9/2004 | Ellison et al. |
| 2004/0251742 | A1 | 12/2004 | Runge et al. |
| 2005/0197748 | A1 | 9/2005 | Holst et al. |
| 2005/0210298 | A1 | 9/2005 | Schoepp |
| 2007/0032916 | A1 | 2/2007 | Mark |
| 2007/0073908 | A1 | 3/2007 | Gormley |

(Continued)

FOREIGN PATENT DOCUMENTS

EP    2239666 A1 * 10/2010
JP    2007298745 A    11/2007

OTHER PUBLICATIONS

Abstract of Japanese Application Publication No. JP2007298745A, published Nov. 15, 2007.
Morioka, Michio et al, "Telematics Services and Their Prospects for the Future", Hitachi Review vol. 52 (2003), No. 1.

(Continued)

*Primary Examiner* — Paul R Myers
(74) *Attorney, Agent, or Firm* — Capitol City TechLaw; Richard C. Irving

(57) ABSTRACT

A hybrid in-vehicle infotainment network includes a core high-speed network having a number of high-speed nodes, each of which may be connected to at least one other high-speed node via a high-speed backbone link. At least some high-speed nodes may be hybrid nodes. Hybrid nodes may communicate with one or more low-speed devices via one or more low-speed links. Each hybrid node, along with any connected low-speed devices, forms a respective local low-speed network. In some embodiments, hybrid nodes may conform with a 1394 specification for high-speed backbone link communications and may conform with a universal serial bus (USB) specification for low-speed link communications. Communications via the high-speed backbone links and the low-speed links may use a common application layer having defined therein a same maximum packet size and a same set of commands and vendor-specific identifiers.

20 Claims, 3 Drawing Sheets

U.S. PATENT DOCUMENTS

| | | | |
|---|---|---|---|
| 2007/0073944 | A1 | 3/2007 | Gormley |
| 2007/0174608 | A1* | 7/2007 | Balandin et al. .............. 713/155 |
| 2007/0176797 | A1 | 8/2007 | Rhodes et al. |
| 2008/0229202 | A1 | 9/2008 | Fang et al. |
| 2009/0248918 | A1* | 10/2009 | Diab et al. ...................... 710/51 |

OTHER PUBLICATIONS

"HSAutoLink™ High Speed In-Vehicle Data Bus", Molex 2009, 6 pages, retrieved at http://rhu004.sma-promail.com/SQLImages/kelmscott/Molex/PDF_Images/987650-2302.PDF.

Nezu, Akio et al., IDB-1394 and SmartCODEC enable in-vehicle video entertainment and information systems, 2009, 10 pages, retrieved at: http://www.videsignline.com/howto/showArticle.jhtml?articleID=192300074 on May 29, 2009.

"DelphiA's New USB Consumer Port Satisfies Growing Demand for In-Vehicle Data Exchange", Nov. 14, 2006, 1 page, retrieved at http://www.sae.org/news/releases/delphi_port.htm.

Shrinath, A. et al., "Electronic control units for automotive electrical power systems: communication and networks", Proc. Instn Mech. Engrs vol. 218 Part D: J. Automobile Engineering, 2004, 14 pages, retrieved at: http://www.ae-plus.com/Journals/Electronics%20-%20Electronic%20control%20units.pdf.

Rabel,Matthias et al.,"Integrating IEEE 1394 as Infotainment Backbone into the Automotive Environment",Vehicular Technology Conference, 2001, 6 pages, VTC 2001 Spring. IEEE VTS 53rd.

"IEEE Standard for a High Performance Serial Bus—Amendment 1", IEEE Std 1394a-2000, IEEE Mar. 30, 2000.

"IEEE Standard for a High-Performance Serial Bus Amendment 2", IEEE Std 1394b-2002, IEEE Dec. 14, 2002.

"IEEE Standard for a High Performance Serial Bus", IEEE Std 1394-1995, IEEE 1996.

"IDB-1394 Automotive Specification 1.0", TA Document 2001018, IEEE Mar. 18, 2003, 116 pages.

Bassler, Max, "New 1394 Automotive Copper Standard", Nikkei Automotive Technology International, Jul. 25, 2008, 1394 Trade Association, 15 pages.

Wollitzer, Michael et al., "Automotive Technology International 2008", Nikkei Automotive Technology International, Jul. 25, 2008, 1394 Trade Association, 16 pages.

Gardner, Mike, "Shielded Twisted Pair (STP)", Nikkei Automotive Technology International, Jul. 25, 2008, 1394 Trade Association, 16 pages.

Helfet, Peter, "1394 COAX System and Connectors", Nikkei Automotive Technology International, Jul. 25, 2008, 1394 Trade Association, 11 pages.

Mourn, Richard,"1394 Electrical Characteristics for-Auto", Nikkei Automotive Technology International, Jul. 25, 2008, 1394 Trade Association, 21 pages.

Sato, Kenya,"AMI-C/ISO Network Communication Mode" ,Nikkei Automotive Technology International, Jul. 25, 2008, 1394 Trade Association, 24 pages.

Mukherjee, Debashis, "IEEE-1394 Automotive Protocol Stack Software", Nikkei Automotive Technology International, Jul. 25, 2008, 1394 Trade Association, 17 pages.

Wong, Ricardo, "1394 Automotive Multimedia Network-Protocol Test Bench at Nissan-", Nikkei Automotive Technology International, Jul. 25, 2008, 1394 Trade Association, 19 pages.

Snider, James, "Status of Copyright Regulations", Nikkei Automotive Technology International, Jul. 25, 2008, 1394 Trade Association, 10 pages.

"AV/C Connection and Compatibility Management Specification 1.1", TA Document 2002010, 1394 Trade Association, Mar. 19, 2003, 87 pages.

"1394 Copper Automotive Standard (Supplement to IDB-1394)", Document No. TS2008001, 1394 Trade Association, Jun. 20, 2008, 111 pages.

"AV/C Digital Interface Command Set General Specification Version 4.2", Document No. 2004006 , 1394 Trade Association, Sep. 1, 2004, 113 pages.

Schultz, Mark, Designing a USB embedded host controller, EE Times Asia, Feb. 16, 2004, 4 pages.

Webb, Warren, "Embedded USB Gains Ground", Tech Trends, Electronics, Design, Stategy, News, Jun. 26, 2003, 5 pages.

"Universal Serial Bus 3.0 Specification", Revision 1.0, Nov. 12, 2008, 482 pages.

"Universal Serial Bus Specification", Revision 2.0, Apr. 27, 2000, 650 pages.

Costlow, Terry, "Ethernet and 1394 spar with MOST infotainment openings", aei technology report, Aug. 2009.

* cited by examiner

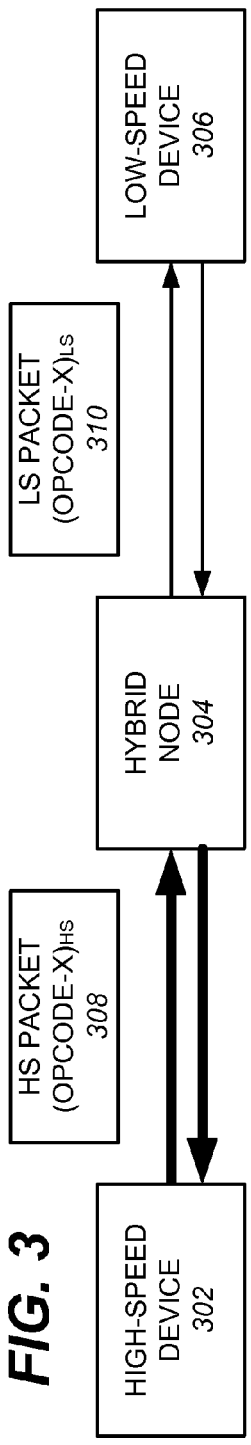
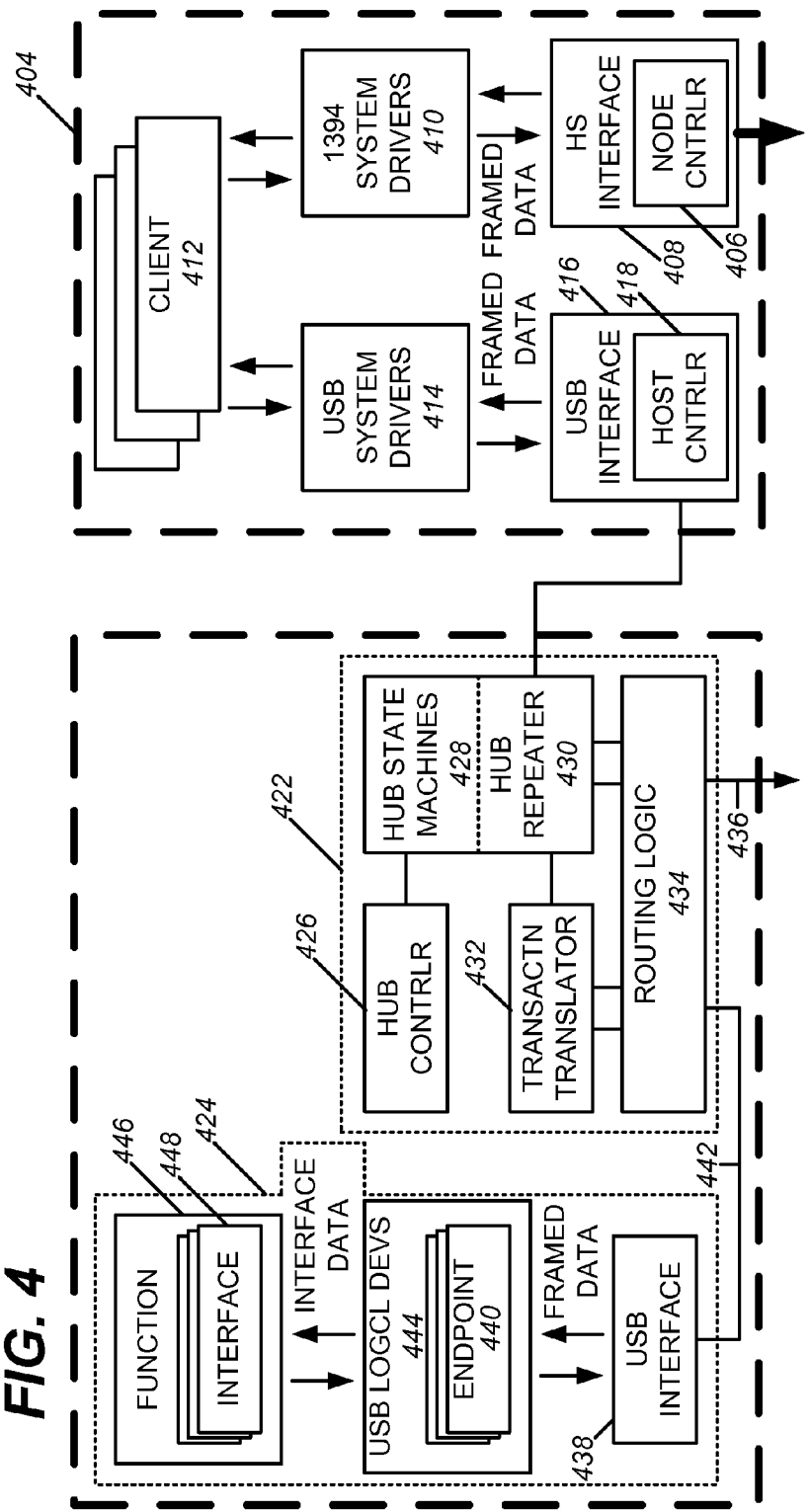

HYBRID IN-VEHICLE INFOTAINMENT NETWORK

BACKGROUND

1. Field of the Invention

The present teachings relate to an in-vehicle infotainment network. In particular, a hybrid in-vehicle infotainment network may have one or more hybrid nodes, each of which may have a relatively high-speed interface and one or more relatively low-speed interfaces for transporting data, including, but not limited to, audio data and high definition video data.

2. Discussion of the Related Art

One existing in-vehicle infotainment network for transporting audio data and/or video data is essentially an analog network. As a result, the in-vehicle infotainment network has a number of discrete wires for each signal and large and heavy harnesses for holding the discrete wires in place within a vehicle. The in-vehicle infotainment network is incapable of streaming High Definition (HD) video because a digital transport is required for High-bandwidth Digital Content Protection (HDCP) compliance.

Specialized buses have been added to the existing in-vehicle infotainment network to improve performance. Each time a new type of bus is added, a number of gateways in the in-vehicle infotainment network may increase because the new type of bus may use messages and communication protocols not currently used in the existing in-vehicle infotainment network.

In many cases, existing hardware of the in-vehicle infotainment network must be changed to accommodate new hardware. The new hardware may use more bandwidth than the in-vehicle infotainment network is presently capable of providing. In such a situation, existing hardware and/or software may be modified to accommodate new types of buses. As a result, the in-vehicle infotainment network may become confused and motley, thereby making further development difficult, error prone, and slow.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A hybrid in-vehicle infotainment network is disclosed. The in-vehicle infotainment network includes a number of high-speed nodes, each of which may be connected to at least one other high-speed node via a high-speed backbone link. The connected high-speed nodes may form a core high-speed network. Some of the high-speed nodes may be hybrid nodes, each of which may have at least one connection to at least one low-speed device via a low-speed link. Each of the hybrid nodes along with any connected low-speed devices form a respective local low-speed network. Thus, the hybrid in-vehicle infotainment network may have a modular architecture.

In some embodiments of a hybrid in-vehicle infotainment network, high-speed nodes, including hybrid nodes, may conform with a 1394 specification when communicating over a high-speed backbone link. Hybrid nodes may further conform to a universal serial bus (USB) specification when communicating with low-speed devices over a low-speed link. As a result, high-speed nodes may communicate with other high-speed nodes via node to node (or host to host) communication, with the high-speed nodes (or hosts) acting as peers.

In various embodiments, communications via the high-speed backbone link and the low-speed link may have a common application layer. A same set of commands and vendor-specific identifiers may be used by the common application layer communication over the high-speed backbone link and the low-speed link. In addition, a common application layer packet on the high-speed backbone link and the low-speed link may have a same maximum size. As a result, the various embodiments of the hybrid in-vehicle infotainment network may use fewer, if any, gateways.

BRIEF DESCRIPTION OF THE DRAWING

In order to describe the manner in which the above-recited and other advantages and features can be obtained, a more particular description is described below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

FIG. 3 illustrates an exemplary application layer packet moving through a portion of a hybrid in-vehicle network.

FIG. 4 shows a more detailed view of an exemplary hybrid USB/1394 node and an exemplary USB device in one embodiment.

DETAILED DESCRIPTION

Overview

Figure 1:
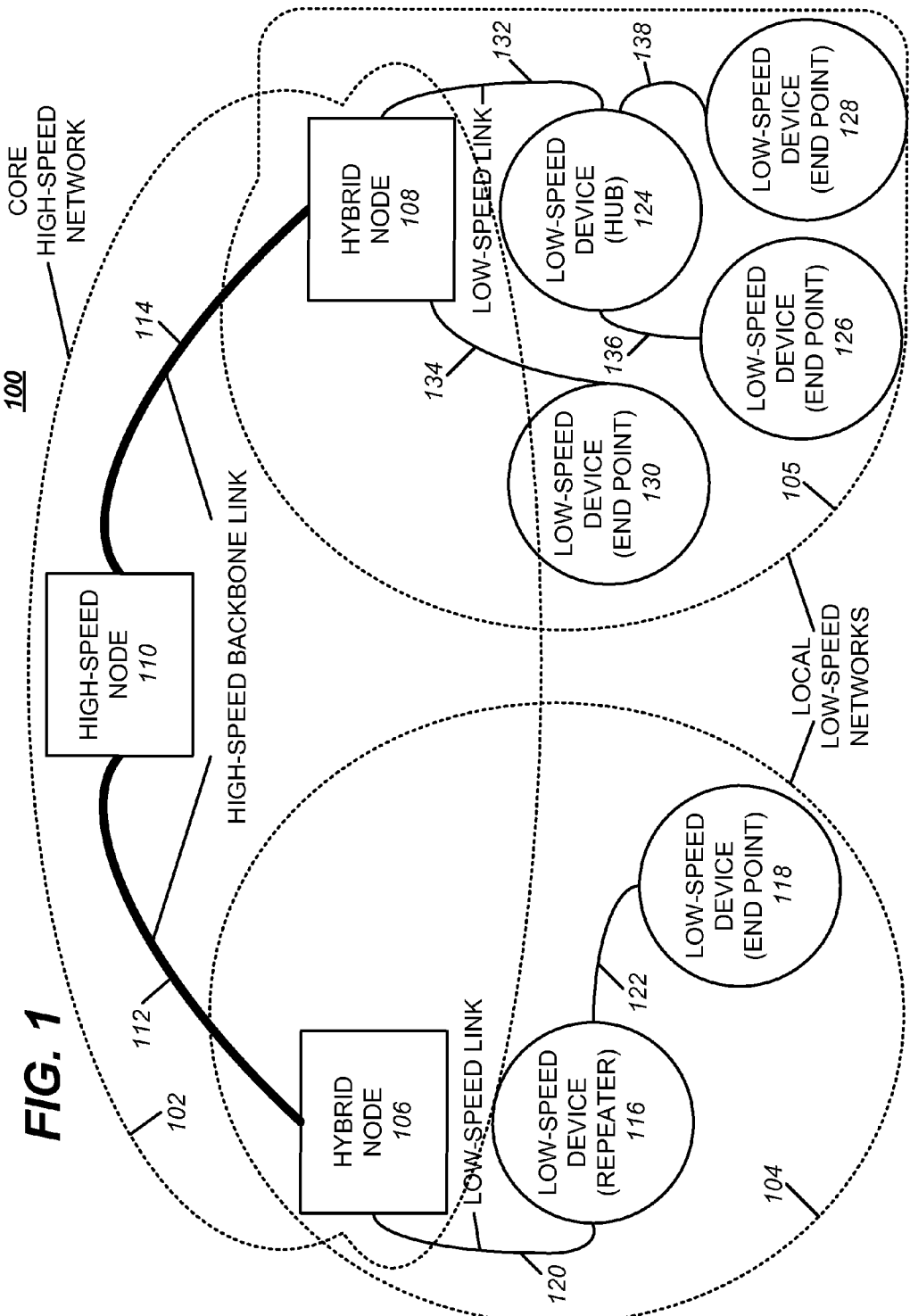
FIG. 1 illustrates an exemplary hybrid in-vehicle network.

An in-vehicle infotainment network with a modular architecture is disclosed. Hardware units of the modular architecture may be reused in a new in-vehicle infotainment network as long as software for the hardware units is supported in the new in-vehicle infotainment network.

In various embodiments, an in-vehicle infotainment network is provided, which has nodes connected to one another via one or more relatively high-speed backbone links (hereinafter, referred to as "high-speed backbone links"). At least some of the nodes may be hybrid nodes, which are capable of communicating over a high-speed backbone link to another node. The hybrid nodes may also communicate with one or more relatively low-speed devices (hereinafter, referred to as "low-speed devices") via one or more relatively low-speed links (hereinafter, referred to as "low-speed links"). A low-speed device may be a repeater, a hub, or an end point.

A repeater may have one connection with a hybrid node, a hub, or a second repeater via a first low-speed link, and a second connection with a third repeater, a second hub, or an end point. In some embodiments, up to seven low-speed devices may be daisy-chained with one another. A hub may have one connection with a hybrid node or a repeater, and a number of connections with end points via low-speed links. An end point may be an audio device, a multimedia device, or other type of device, which has one connection to a hub, a repeater, or a hybrid node via a low-speed link.

The in-vehicle infotainment network may include one or more relatively high-speed nodes (hereinafter, referred to as "high-speed nodes") connected, respectively, to another high-speed node via a high-speed backbone link. At least some of the high-speed nodes may be hybrid nodes. Some of the one or more high-speed nodes may also be connected to a high-speed end point via a high-speed backbone link. The high-speed end point may be an audio system, a multimedia entertainment system, or another type of high-speed end point. In a typical embodiment, a data stream may be provided from an end point connected to a hybrid node, either directly or indirectly through a hub and/or a repeater, through a high-speed backbone link connected to the hybrid node to either a high-speed end point or a high-speed node connected to the high-speed end point via the high-speed backbone link.

In one embodiment, high speed nodes may communicate with one another using a peer-to-peer protocol architecture. Thus, any high-speed node may communicate with any other high-speed node via one or more high-speed backbone links. Communication among a hybrid node and a low-speed end point and any intervening hubs and/or repeaters may use a master-slave protocol architecture.

In one implementation, communications via a high-speed backbone link may conform to a 1394 specification (hereinafter, referred to as a "1394 node"), including, but not limited to, an IDB-1394 specification. A hybrid node may have one or more ports, which conform to the 1394 specification, including, but not limited to, the IDB-1394 specification, and one or more ports which conform to a universal serial bus (USB) specification, including, but not limited to, a USB 2.0 specification.

Exemplary In-Vehicle Infotainment Network

FIG. 1 illustrates an exemplary embodiment of an in-vehicle infotainment network 100. In-vehicle infotainment network 100 may include a core high-speed network 102 and two local low-speed networks 104, 105. Other in-vehicle infotainment networks may have a different number of local low-speed networks, such as, for example, one or more local low-speed networks.

Core high-speed network 102 may include at least two high-speed nodes. At least one of the at least two high-speed nodes may be a hybrid node. Core high-speed network 102, shown in FIG. 1, has three high-speed nodes 106, 108, 110, two of which are hybrid nodes 106, 108. Hybrid node 106 and high-speed node 110 may communicate with one another via a high speed backbone link 112. Hybrid node 108 and high-speed node 110 may communicate with one another via a high speed backbone link 114. Communications between any two high-speed nodes may employ a peer-to-peer protocol architecture.

Local low-speed network 104 may include hybrid node 106, a low-speed device (which may be a repeater 116), and a low-speed device (which may be an end point 118). Hybrid node 106 and repeater 116 may communicate with one another via a low-speed link 120. Repeater 116 and end point 118 may communicate with one another via a low-speed link 122. Communications via low-speed links 120, 122 may employ a master-slave protocol architecture, in which a hybrid node 106 may act as a master and end point 118 may act as a slave. Repeater 116 may simply pass any received messages from one of low-speed links 120, 122 to another of low-speed links 120, 122. An end point may include, but not be limited to, an audio device that provides audio data to in-vehicle infotainment network 100, or a multimedia device that provides audio and/or video data to in-vehicle infotainment network 100. For example, end point 118 may be a radio tuner, a digital audio player, or other source of audio and/or video data. In one implementation, provided audio data may be transported through in-vehicle infotainment network 100 to an in-vehicle audio system (not shown) connected to hybrid node 106 or high-speed node 110. In other embodiments, end point 118 may be a device that provides another type of data to be transported through in-vehicle infotainment network 100.

Local low-speed network 105 may include hybrid node 108, a hub 124, and end points 126, 128, 130. Hybrid node 108 may communicate with hub 124 and end point 130 via low-speed links 132, 134. Hub 124 may communicate with multiple end points, such as, for example, end points 126, 128 via low-speed links 136, 138, respectively.

Core high-speed network 102 and local low-speed networks 104, 105 are only exemplary. In other embodiments, core high-speed network 102 may include a different number of high-speed nodes. For example, core high-speed network 102 may include two high-speed nodes (one of which may be a hybrid node), two high-speed nodes (both of which may be hybrid nodes), or another combination of one or more high-speed nodes.

In one embodiment of an in-vehicle infotainment network, any non-hybrid high-speed nodes may be conventional 1394 nodes. Hybrid nodes may communicate over high-speed backbone links that conform with the 1394 specification, including, but not limited to, the IDB-1394 specification. Hybrid nodes may also communicate over one or more low-speed links conforming to a universal serial bus (USB) specification, including, but not limited to, USB 2.0. In other embodiments, high-speed nodes may communicate over high-speed backbone links conforming to a different high-speed interface specification and the hybrid nodes may communicate over respective low-speed links conforming to a different low-speed interface specification.

Exemplary Hybrid Network Architecture

Figure 2:
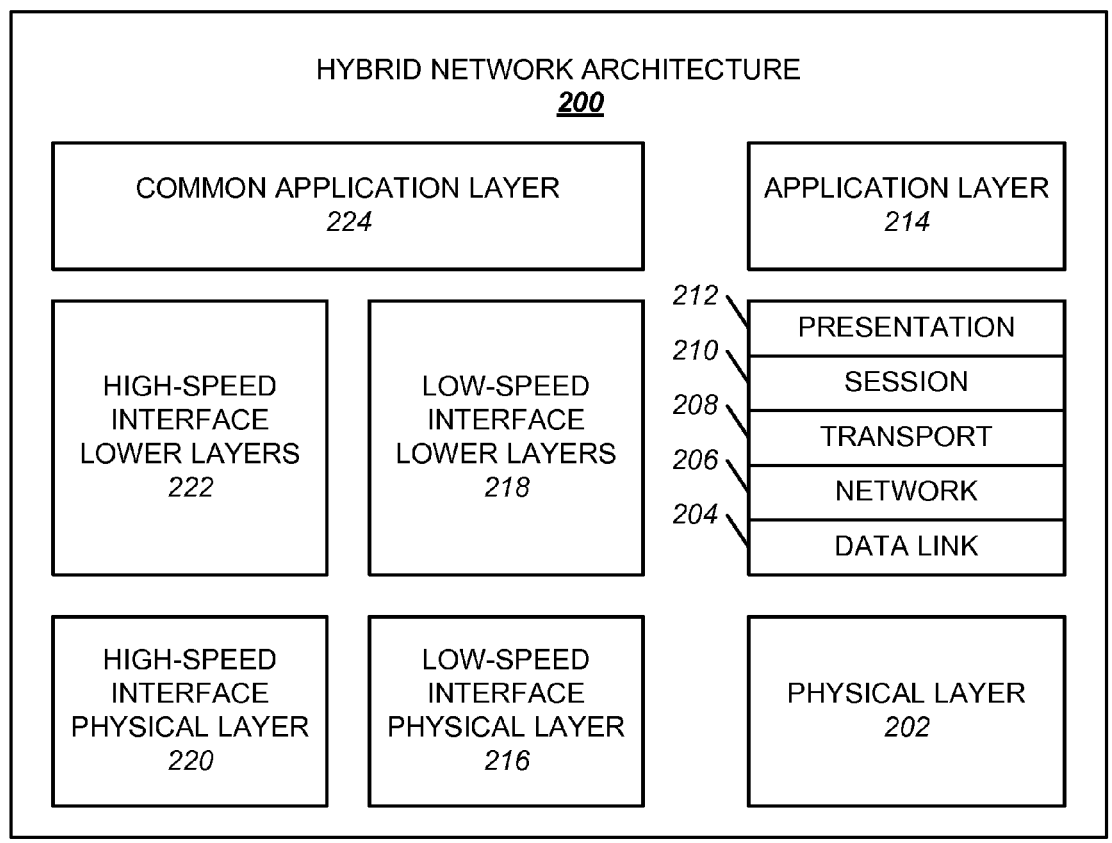
FIG. 2 is a block diagram showing an exemplary hybrid network architecture.

FIG. 2 illustrates an exemplary protocol architecture 200 of an in-vehicle infotainment network. Physical layer 202, data link layer 204, network layer 206, transport layer 208, session layer 210, presentation layer 212 and application layer 214 are communication protocol layers, or a protocol stack, which conform to an Open System Interconnection (OSI) Reference Model.

Physical layer 202 may define electrical signaling, mechanical connectors, cabling, arbitration mechanisms and serial coding/decoding of data.

Data link layer 204 is responsible for transporting data between adjacent network nodes in a wide area network or between nodes in a segment of a same local area network segment. Data link layer 204 may detect and possibly correct errors that may occur in physical layer 202.

Network layer 206 is responsible for transferring variable length data sequences from a source to a destination via one or more networks, while maintaining a quality of service requested by transport layer 208. Network layer 206 may perform fragmentation and reassembly, and may report delivery errors.

Transport layer 208 is responsible for transparently transferring data between end points and for providing reliable data transfer services to upper protocol layers. Transport layer 208 may control a given link's reliability via a number of techniques, such as, flow control, segmentation/desegmentation, and error control.

Session layer 210 may control connections between computing devices. Session layer 210 may be responsible for establishing, managing and terminating connections between a first application executing on a local computing device and a second application executing on a remote computing device.

Presentation layer 212 is responsible for establishing a context between application layer 214 entities, in which application layer 214 entities may use different syntax and semantics. Presentation layer 212 may understand the different syntax and semantics and may translate data into a form that application layer 214 can accept, and vice versa. Presentation layer 212 data units may be encapsulated into session protocol data units and moved down the protocol stack. Presentation layer 212 may be responsible for formatting and encrypting data to be sent across a network.

Application layer 214 may interact directly with software applications that implement a communicating component. Typically, application layer 214 functions include identifying communication partners, determining resource availability, and synchronizing communication.

A low-speed interface physical layer 216, may, in some embodiments, conform to a USB physical layer. A general USB network is hierarchical, with one host controller at a top tier. The network may include cables, each of which may be up to 5 meters long, and hubs, which route and distribute signals between devices.

A low-speed interface for lower layers 218 may correspond to data link layer 204, network layer 206, transport layer 208, session layer 210, and presentation layer 212 of the OSI Reference Model. In some embodiments, low-speed interface for lower layers 218 may conform to corresponding lower layers of a USB specification.

A high-speed interface physical layer 220, may in some embodiments, conform to the IEEE 1394 specification or the IDB-1394 specification.

A high-speed interface for lower layers 222 may correspond to data link layer 204, network layer 206, transport layer 208, session layer 210, and presentation layer 212 of the OSI Reference Model. In some embodiments, high-speed interface for lower layers 222 may conform to corresponding lower layers of the IEEE 1394 specification or the IDB-1394 specification.

The high-speed interface and the low-speed interface may have a common application layer 224 corresponding to application layer 214 of the OSI Reference Model. Application layer 224 may be programmable for the high-speed interface and the low-speed interface, such that application layer 224 for both interfaces may have a same set of command codes and vendor-specific identifiers for application layer 224 packets. Further, command codes for new devices may be added to application layer 224 for both the high-speed interface and the low-speed interface. In some embodiments, a common maximum application layer packet size may be configured for both the high-speed interface and the low-speed interface, such that fragmentation and reassembly of packets is unnecessary.

FIG. 3 illustrates a data flow from a high-speed device 302, through a hybrid node 304, to a low-speed device 306, and from low-speed device 306, through hybrid node 304, to high-speed device 302. One of high-speed device 302 or hybrid node 304 may send a high-speed application layer packet 308 having a common command code of, for example, opcode-X to another one of high-speed device 302 or hybrid node 304. High-speed application layer packet 308 may be encapsulated in packets of high-speed interface lower layers 222, which may be expressed in electrical signaling according to high-speed interface physical layer 220. As previously mentioned, in one embodiment, high-speed interface physical layer 220 and high-speed interface lower layers 222 may conform to a high-speed interface specification, such as, for example, IEEE 1394 or IDB-1394. In other embodiments, high-speed interface physical layer 220 and high-speed interface lower layers 222 may conform to another high-speed interface specification.

One of hybrid node 304 and low-speed device 306 may send a low-speed application layer packet 310 to another of hybrid node 304 or low-speed device 306 via a low-speed link. Low-speed application layer packet 310 may be encapsulated in packets of low-speed interface lower layers 218, which may be expressed in electrical signaling according to low-speed interface physical layer 216. In one embodiment, low-speed interface physical layer 216 and low-speed interface lower layers 218 may conform to a low-speed interface specification, such as, for example, a USB specification. In other embodiments, low-speed interface physical layer 216 and low-speed interface lower layers 218 may conform to another low-speed interface specification.

FIG. 4 is a block diagram illustrating an exemplary embodiment having a USB/1394 hybrid architecture. FIG. 4 shows a USB device 402 and a hybrid USB/1394 node 404. Hybrid USB/1394 node 404 may include a 1394 interface 408 with a node controller 406, 1394 system drivers 410, client modules 412, USB system drivers 414, and a USB interface 416 with a host controller 418.

Hybrid USB/1394 node 404 may transmit and receive data via a 1394 bus connected to a high-speed interface controller, such as, for example, node controller 406 of 1394 interface 408. As mentioned previously, the 1394 specification has a peer-to-peer protocol architecture. That is, hybrid USB/1394 node 404 may have a peer-to-peer connection with a 1394 device, such as, for example, a 1394 node, or another hybrid USB/1394 node, via the 1394 bus connected to node controller 406 of 1394 interface 408.

1394 interface 408 may communicate with 1394 system drivers 410. Data transported between 1394 system drivers 410 and 1394 interface 408 may be encapsulated in 1394 frames. 1394 system drivers 410 may communicate the data from the encapsulated 1394 frames with client modules 412, or may communicate data received from client modules 412 to 1394 interface 408 in encapsulated 1394 frames.

Client modules 412 may further communicate with USB system drivers 414. Data transported between client modules 412 and USB system drivers 414 may include data that client modules 412 receive from 1394 system drivers 410, and data that USB system drivers 414 receive from USB interface 416.

Data transported between USB system drivers 414 and USB interface 416 may be encapsulated in USB frames. A low-speed peripheral bus controller, such as, for example, host controller 418 of USB interface 416, may communicate with USB device 402 via a USB link 420. The USB specification conforms to a master/slave protocol architecture. That is, a master may poll a slave for data and the slave may not send the data to the master until the master gives permission to the slave to access a USB link connecting the master with slave. If the master has data to send to the slave, the master may poll the slave to determine whether the slave is ready to receive the data before sending the data to the slave. In communications between hybrid USB/1394 node 404 and USB device 402, hybrid USB/1394 node 404 may function as a master and USB device 402 may function as a slave.

USB device 402 may include a hub portion 422 and a USB device portion 424. Hub portion 422 may include a hub controller 426, hub state machines 428, hub repeater 430, transaction translator 432, and routing logic 434. Hub repeater 430 may include a low-speed peripheral bus controller and may communicate with hybrid USB/1394 node 404 via USB link 420. Hub state machines 428 maintains a current state with respect to a connection between hub portion 422 and a USB device, which, in this example, may be hybrid USB/1394 node 404, USB device portion 424, or another USB device, such as, for example, a hub, a repeater, or an end point (not shown). Hub controller 426 may determine an action to take based on data to be sent and a state, as maintained by hub state machines 428.

Each frame of USB data may include a destination address and an origination address. Transaction translator 432 may perform address translation with respect to the destination address and the origination address. For example, suppose that hybrid USB/1394 node 404 sends a USB frame of data to USB device 402 with an origination address corresponding to hybrid USB/1394 node 404 and a destination address corresponding to USB device 402. Transaction translator 432 may determine that the USB frame is destined for a USB device (not shown) connected to USB device 402 via a USB link 436. In such a case, transaction translator 432 may translate the destination address in the USB frame to a second destination address, corresponding to the USB device (not shown) connected to USB device 402 through USB link 436, before sending the USB frame to the USB device (not shown). In addition, transaction translator 432 may translate an origination address in a USB frame. Continuing with the above example, transaction translator 432 may translate an origination address in the received USB frame from an address corresponding to hybrid USB/1394 node 404 to another address corresponding to hub portion 422.

Routing logic 434 may receive a USB frame and may determine a next USB device to receive the USB frame as it travels toward its destination. In USB device 402, routing logic 434 may route USB frames to the USB device (not shown) via USB link 436 or may route USB frames to one of USB endpoints 440 via a logical USB link 442.

USB device portion 402 may include a USB interface 438, USB logical devices 444 (each of which may include a respective USB end point 440), and functions 446, which may include a number of interfaces 448.

Communications between USB interface 438 and end points 440 may include USB framed data. Communications between end points 440 and interfaces 448 may include interface data.

USB device 402 and hybrid USB/1394 node 404 are only exemplary. In other embodiments, a USB device and a hybrid USB/1394 node may have different or other components. For example, a USB device may not include a USB device portion 424, or a hub portion 422, but may include a USB interface 438 connected to hybrid USB/1394 node 404 for receiving and sending USB framed data with an end point of end points 440 of logical devices 444. Other configurations of a USB device may be employed in other embodiments.

In some embodiments, a hybrid USB/1394 node may include hub portion 422 within USB interface 416, along with host controller 418. In such embodiments, the hybrid USB/1394 node may have multiple USB ports connected to respective USB links. Other embodiments may employ other configurations of a hybrid USB/1394 controller.

Miscellaneous

USB links alone tend to work poorly as network buses mainly because a host unit controls connected devices in a master/slave architecture. A typical USB system has only one host. A USB cable has a short cable length, which may limit its usefulness in a vehicle. A bandwidth of automotive grade USB (full speed at 12 Mbps) further limits a type of media that can be streamed over USB. Large bit rate video, such as, for example, digital video disc (DVD) and Blu-Ray are expected to exceed the bandwidth capabilities of the automotive grade USB. USB is ideal for low bit rate media, such as, for example, audio, and command-and-control data.

In embodiments that implement a hybrid USB/1394 architecture, the above-mentioned limitations of USB are overcome by providing a high-speed core bus having multiple USB hosts residing thereon, as well as high-performance 1394 nodes. In various implementations, the USB hosts may be strategically placed in local USB networks located in, for example, a rear portion of a vehicle. A 1394 network makes host to host communication possible with hosts acting as peers, extends a reach of a USB network and provides bandwidth for transporting high bit rate media such as, for example, high definition video. USB and 1394 have plug and play interfaces. As long as additional ports are provided for expansion, an in-vehicle infotainment network can be continually upgraded throughout a vehicle's lifetime as long as a 1394 bus' capacity is not exceeded. An in-vehicle infotainment network that has a hybrid USB/1394 architecture blends performance of 1394 with cost effectiveness of USB.

Conclusion

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they are not to be construed as limiting the claims in any way. Other configurations of the described embodiments are part of the scope of this disclosure. For example, components of a USB device and a hybrid node, illustrated in FIG. 4, may vary in other embodiments, and may include additional, fewer, additional or other components. Accordingly, the appended claims and their legal equivalents define the invention, rather than any specific examples given.

I claim:

1. An in-vehicle infotainment network comprising:
a plurality of high-speed nodes connected via at least one high-speed backbone link, the at least one high-speed backbone link being capable of transporting high definition video data between a pair of the plurality of high-speed nodes, at least some of the high-speed nodes comprising:
   a low-speed peripheral bus controller for sending first packets to a peripheral device or a repeater device and for receiving second packets from the peripheral device or the repeater device via a low-speed bus, the low-speed bus being capable of transporting low bit rate media data and command-and-control data, and
   a high-speed interface controller for sending third packets to one of the plurality of high-speed nodes via a high-speed backbone link of the at least one high-speed backbone link and for receiving fourth packets from the one of the plurality of high-speed nodes via the high-speed backbone link, wherein:
communications via the low-speed bus conform to a first protocol architecture having a first plurality of protocol layers, one of the first plurality of protocol layers being a first application layer,
communications via the high-speed backbone link conform to a second protocol architecture having a second plurality of protocol layers, one of the second plurality of protocol layers being a second application layer,
the second application layer is programmable for a high-speed backbone interface,
the first application layer is programmable for a low-speed interface,
the second application layer and the first application layer are programmed to use a same set of command codes, and the in-vehicle infotainment network is included within an automobile.

2. The in-vehicle infotainment network of claim 1, wherein the at least one high-speed backbone link conforms to a 1394 specification.

3. The in-vehicle infotainment network of claim 1, wherein the low-speed bus is a universal serial bus.

4. The in-vehicle infotainment network of claim 3, wherein the at least one high-speed backbone link conforms to a 1394 specification.

5. The in-vehicle infotainment network of claim 1, wherein a payload for corresponding command and control data packets is identical with respect to an interface of the at least one high-speed backbone link and an interface of the low-speed bus.

6. The in-vehicle infotainment network of claim 1, wherein a same set of vendor-specific device identifiers are used with respect to the third packets and the fourth packets being transported via the at least one high-speed backbone link and the first packets and the second packets being transported via the low-speed bus.

7. The in-vehicle infotainment network of claim 1, wherein the low-speed peripheral bus controller and the high-speed interface controller are configured to have a same maximum payload size.

8. The in-vehicle infotainment network of claim 1, further comprising
a repeater, the repeater having a first low-speed bus connection with a second repeater or with the low-speed peripheral bus controller of one of the at least some high-speed nodes, and the repeater being arranged to have a second connection with either a third repeater or a peripheral device.

9. The in-vehicle infotainment network of claim 1, wherein:
a first protocol used by the low-speed peripheral bus controller is a master/slave type protocol, and
a second protocol used by the high-speed interface controller is a peer-to-peer type protocol.

10. A method of using an infotainment network, the method comprising:
receiving, at a first node of the infotainment network, a first packet from a first device via a low-speed peripheral bus; and
sending a second packet, including first information from the first packet, from the first node to a second node of the infotainment network via a high-speed backbone link, wherein:
communications via the low-speed peripheral bus conform to a first protocol architecture having a first plurality of protocol layers, one of the first plurality of protocol layers being a first application layer,
communications via the high-speed backbone link conform to a second protocol architecture having a second plurality of protocol layers, one of the second plurality of protocol layers being a second application layer,
the second application layer is programmable for a high-speed interface,
the first application layer is programmable for a low-speed interface,
the first application layer and the second application layer are programmed to use a same set of command codes, and
the infotainment network is included within an automobile.

11. The method of claim 10, wherein:
the first device is a third node of the infotainment network, and
the first information originates from a multimedia device.

12. The method of claim 10, wherein the first device includes a multimedia device.

13. The method of claim 10, wherein the communications via the high-speed backbone link conform to an IDB-1394 specification.

14. The method of claim 10, wherein the communications via the low-speed peripheral bus conform to a universal serial bus specification.

15. The method of claim 14, wherein the communications via the high-speed backbone link conform to an IDB-1394 specification.

16. The method of claim 10, wherein a maximum size of a payload for command and control packets of the first application layer defined for the low-speed peripheral bus is equal to a maximum size of a payload for command and control packets of the second application layer defined for the high-speed backbone link.

17. The method of claim 10, wherein a same set of vendor-specific device identifiers are defined for use with the command and control packets of the first application layer and for use with the second application layer.

18. The method of claim 10, wherein the communications via the low-speed peripheral bus conform to a master-slave architecture.

19. The method of claim 18, wherein the communications over the high-speed backbone link conform to a peer-to-peer architecture.

20. The method of claim 10, wherein:
the first node includes a logical universal serial bus device connected to a universal serial bus hub within the first node via a logical low-speed peripheral bus.

* * * * *